(12) United States Patent
Marsh et al.

(10) Patent No.: US 8,207,947 B2
(45) Date of Patent: Jun. 26, 2012

(54) ELECTRONIC DOCUMENT READERS AND READING DEVICES

(75) Inventors: Matthew Marsh, London (GB); Timon Botez, London (GB); Nicole Hodgkinson, London (GB); David Tonge, London (GB)

(73) Assignee: Plastic Logic Limited, Cambridge, Cambridgeshire (GB)

( * ) Notice: Subject to any disclaimer, the term of this patent is extended or adjusted under 35 U.S.C. 154(b) by 999 days.

(21) Appl. No.: 12/027,160

(22) Filed: Feb. 6, 2008

(65) Prior Publication Data
US 2008/0297470 A1 Dec. 4, 2008

(30) Foreign Application Priority Data

Feb. 7, 2007 (GB) .................................. 0702349.2

(51) Int. Cl.
*G06F 3/041* (2006.01)
*G06F 3/033* (2006.01)
*G06F 3/045* (2006.01)
*G09G 5/00* (2006.01)
*G09G 3/34* (2006.01)

(52) U.S. Cl. ........ 345/173; 345/184; 345/901; 345/174; 345/156; 345/107; 455/566; 178/18.03; 178/18.05; 178/18.06; 361/679.56

(58) Field of Classification Search .................. 345/159, 345/173–174, 169, 156, 107, 901; 347/139; 705/26; 455/556.2, 566; 178/18.03–18.07; 361/679.09, 679.26, 679.55, 679.56
See application file for complete search history.

(56) References Cited

U.S. PATENT DOCUMENTS

| 4,453,200 A | 6/1984 | Treka et al. |
| 4,856,088 A | 8/1989 | Oliwa et al. |

(Continued)

FOREIGN PATENT DOCUMENTS

| EP | 0 283 235 | 5/1987 |

(Continued)

OTHER PUBLICATIONS www.palm.com, Palm Z22, T/X, and Tungsten E2 handhelds (copyright 2005).

(Continued)

*Primary Examiner* — Lun-Yi Lao
*Assistant Examiner* — Jarurat Suteerawongsa
(74) *Attorney, Agent, or Firm* — Fish & Richardson P.C.

(57) ABSTRACT

This invention generally relates to an electronic document readers and reading devices, that is to a device that presents a document to a user on a display to enable the user to read the document. An electronic document reading device configured for one hand operation, the device including: a housing; an electroactive display mounted in said housing; control electronics coupled to said display; at least one user control coupled to said control electronics for operating said device; and a rechargeable power source configured to power said control electronics and said display; and wherein said housing has a width to fit at least on the palm of an adult human hand, said width being less than approximately 120 mm, and wherein said housing has a length of at least twice said width, and wherein said control electronics and said rechargeable power source are disposed within said housing so as to provide a center of mass of said device which, when a lower part of said device is held in a said palm, is located at a distance of no greater than 50% of said length from a lower end of said device.

6 Claims, 4 Drawing Sheets

U.S. PATENT DOCUMENTS

| | | | |
|---|---|---|---|
| 5,347,630 A | 9/1994 | Ishizawa et al. | |
| 5,857,157 A | 1/1999 | Shindo | |
| 5,956,034 A | 9/1999 | Sachs et al. | |
| 6,297,945 B1 | 10/2001 | Yamamoto | |
| 6,388,877 B1 | 5/2002 | Canova, Jr. et al. | |
| 6,456,732 B1 | 9/2002 | Kimbell et al. | |
| 6,661,920 B1 | 12/2003 | Skinner | |
| 6,831,662 B1 | 12/2004 | Lum et al. | |
| 6,859,218 B1* | 2/2005 | Luman et al. | 347/139 |
| 6,888,643 B1 | 5/2005 | Grimes | |
| 6,919,879 B2 | 7/2005 | Griffin et al. | |
| 6,961,029 B1 | 11/2005 | Canova, Jr. et al. | |
| 7,058,829 B2 | 6/2006 | Hamilton | |
| 7,079,111 B2 | 7/2006 | Ho | |
| 7,289,084 B2 | 10/2007 | Lesniak | |
| 2001/0007980 A1* | 7/2001 | Ishibashi et al. | 705/26 |
| 2002/0018027 A1 | 2/2002 | Sugimoto | |
| 2002/0102866 A1* | 8/2002 | Lubowicki | 439/1 |
| 2003/0151600 A1* | 8/2003 | Takeuchi et al. | 345/204 |
| 2004/0008398 A1 | 1/2004 | Amundson | |
| 2004/0268004 A1* | 12/2004 | Oakley | 710/303 |
| 2005/0025387 A1 | 2/2005 | Luo | |
| 2005/0206580 A1 | 9/2005 | Koyama et al. | |
| 2005/0237444 A1 | 10/2005 | You | |
| 2005/0257143 A1 | 11/2005 | Lewis | |
| 2006/0026536 A1 | 2/2006 | Hotelling et al. | |
| 2006/0197753 A1* | 9/2006 | Hotelling | 345/173 |
| 2006/0202925 A1* | 9/2006 | Manning et al. | 345/87 |
| 2006/0274549 A1 | 12/2006 | Fukuyoshi | |
| 2007/0024603 A1 | 2/2007 | Li | |
| 2007/0028086 A1 | 2/2007 | Oshima et al. | |
| 2007/0058178 A1 | 3/2007 | Kurihara et al. | |
| 2007/0115258 A1 | 5/2007 | Cupps et al. | |
| 2007/0195009 A1 | 8/2007 | Yamamoto et al. | |
| 2008/0297496 A1 | 12/2008 | Watson et al. | |
| 2008/0298083 A1 | 12/2008 | Watson et al. | |
| 2009/0109185 A1 | 4/2009 | Barclay et al. | |
| 2009/0109468 A1 | 4/2009 | Barclay et al. | |
| 2009/0109498 A1 | 4/2009 | Barclay et al. | |
| 2009/0113291 A1 | 4/2009 | Barclay et al. | |
| 2009/0219271 A1 | 9/2009 | Bandel et al. | |

FOREIGN PATENT DOCUMENTS

| | | |
|---|---|---|
| EP | 1 308 825 | 5/2003 |
| GB | 2 214 342 | 8/1989 |
| GB | 2 446 499 | 8/2008 |
| GB | 2 454 032 | 4/2009 |
| GB | 2 454 033 | 4/2009 |
| JP | 10-027162 | 1/1998 |
| JP | 2005266968 | 9/2005 |
| JP | 2005/274832 | 10/2005 |
| WO | 02/95555 | 5/2002 |
| WO | 03/017245 | 8/2002 |
| WO | 03/044765 | 5/2003 |
| WO | 2004/114259 | 12/2004 |
| WO | 2006/031347 | 3/2006 |
| WO | 2009/053738 | 4/2009 |
| WO | 2009/053740 | 4/2009 |
| WO | 2009/053743 | 4/2009 |
| WO | 2009/053747 | 4/2009 |

OTHER PUBLICATIONS

Search Report; GB 0802011.7; R. Jenkins; Jun. 18, 2008.
Iddo Genuth: "the Future of Electronic Paper" [Online]; Oct. 15, 2007, XP002513292; http://thefutureofthings.com/articles/1000/the-future-of-electronic-paper.html.
International Search Report; PCT/GB2008/050985; Feb. 23, 2009; E. Maciu.
International Search Report; GB 0802816.9; J. McCann; May 23, 2008.
International Search Report; PCT/GB2008/050977; Feb. 19, 2009; E. Maciu.
International Search Report; GB 0802818.5; J. McCann; May 29, 2008.
Search Report; GB0802820.1; R. Jenkins; Sep. 12, 2008.
International Search Report; PCT/GB2008/050975; Feb. 20, 2009; E. Maciu.
Search Report; GB 0801987.9; D. Maskery; May 19, 2008.
www.palm.com; Palm Z22,TIand Tungsten E2 handhelds.
International Search Report; GB0801998.6; D. Maskery; May 28, 2008.
Search Report and Examiner Letter for Application No. GB0802011.7 (dated Aug. 27, 2009).

* cited by examiner

| 306 | ELECTROPHORETIC DISPLAY |
|---|---|
| 304 | ORGANIC ACTIVE MATRIX PIXEL DRIVER CIRCUITRY |
| 302 | SUBSTRATE |

Figure 3

ELECTRONIC DOCUMENT READERS AND READING DEVICES

CROSS-REFERENCE TO RELATED APPLICATIONS

This application claims the benefit of United Kingdom Patent Application No. 0702349.2, filed Feb. 7, 2007, which is incorporated in its entirety by reference herein.

BACKGROUND OF THE INVENTION

1. Field of the Invention

This invention generally relates to an electronic document readers and reading devices, that is to a device that presents a document to a user on a display to enable the user to read the document.

2. Description of the Related Art

Background prior art relating to electronic document readers can be found in U.S. Pat. No. 6,124,851, US2004/0201633, US2006/0133664, US2006/0125802, US2006/0139308, US2006/0077190, US2005/0260551, U.S. Pat. No. 6,124,851, U.S. Pat. No. 6,021,306, US2005/0151742, and US2006/0119615.

There is, however, a desire for improved electronic readers.

SUMMARY OF THE INVENTION

According to one aspect of the present invention there is provided an electronic document reading device configured for one hand operation, the device comprising: a housing; an electroactive display mounted in said housing; control electronics coupled to said display; at least one user control coupled to said control electronics for operating said device; and a rechargeable power source configured to power said control electronics and said display; and wherein said housing has a width to fit at least on the palm of an adult human hand, said width being less than approximately 120 mm, and wherein said housing has a length of at least twice said width, and wherein said control electronics and said rechargeable power source are disposed within said housing so as to provide a centre of mass of said device which, when a lower part of said device is held in a said palm, is located at a distance of no greater than 50% of said length from a lower end of said device. Preferably the distance is no greater than 33% of said length.

The arrangement of the above device advantageously enables the electronic reader to be operated using one hand.

Preferably the user control comprises a joystick configured for thumb-control by a thumb of a hand holding said device when said lower part of said device is held in said palm. Preferably the user control further comprises at least one push-button adjacent both said joystick and said electroactive display and wherein said control electronics is configured to display a soft function for said push-button on a portion of said display adjacent said push-button.

Preferably the electroactive display comprises an electrophoretic display and wherein said device has a thickness of substantially equal to or less than 8 mm. Preferably the device has a thickness of substantially equal to or less than 5 mm.

Preferably the device further comprises inductively coupled charging system for said rechargeable power source, and wherein said device lacks any external wired connectors. Advantageously, this enables embodiments of the device to entirely dispense with physical electrical connections and hence facilitates inter alia improved device aesthetics.

Preferably, a ratio of a length of a display area of said electroactive display to a width of said display area of said electroactive display is in the range of 2.2:1 to 2.9:1. Preferably, said ratio is approximately 2.45:1. Preferably, said width of said housing is less than 90 mm.

One aspect of the present invention also provides an electronic document reader for displaying electronic documents, said reader comprising: a display for displaying a said electronic document; and a control for controlling displaying of a said electronic document wherein, said control is operable using the same hand of a user that is used to hold said reader whilst carrying said reader in a palm of said hand and reading said electronic document.

The arrangement of the display and the control advantageously enables the electronic reader to be operated using the same hand that is used to hold the reader whilst reading the electronic document.

Preferably, the control comprises a movable joystick on a front surface of said reader and wherein movement of said joystick controls displaying of said electronic documents, and wherein said display comprises no less than 80% of an area of said front surface of said reader. Preferably the display has a width substantially no less than 70 mm. Preferably the control further comprises first and second buttons, disposed adjacent said joystick and wherein said first and second buttons are operable to control displaying of said electronic documents. The relatively large display area offers the user an easily-readable display. Furthermore, the simple configuration of a joystick and two buttons advantageously allows the user to control the displayed electronic documents one-handed.

Preferably, one or more soft functions are displayable on said display adjacent said first and second buttons, said soft functions being determined by an operable mode of said reader. Preferably the control of displaying of said electronic documents by said first and second buttons is determined by said operable mode of said reader by altering the soft functions displayed on the display and the associated action of the buttons depending on the mode of operation of the device, the user is presented with a very simple yet effective user interface, operable using the same hand that is used to hold said reader whilst carrying the reader and reading the electronic document.

Preferably, the control is configured for thumb-control by a thumb of said hand holding said reader when said reader is held in said palm.

Preferably the display has an aspect ratio of a width of said display to a height of said display in the range of 1:2.2 to 1:2.9. Preferably the ratio is approximately 1:2.45. By using such an aspect ratio, the user is presented with an electronic document reader having a display capable of displaying electronic documents in a column format. Such a column format may represent a column format similar to that used in printed newspapers.

Preferably the display comprises an electrophoretic display mounted above a pixel driver circuit. Preferably the pixel driver circuit comprises organic pixel driver circuitry on a plastic substrate. The use of such display enables the device to have a very low power consumption, as no power is used to retain the electronic documents being displayed. The display arrangement also enables a very thin display construction.

Preferably the reader has no external wired connectors. Preferably, the reader is inductively coupleable with a charging device such that electrical power is transferable to a rechargeable power source of said reader. Preferably, the reader comprises storage means for storing one or more electronic documents and a wireless link, said one or more electronic documents being wirelessly receivable from a electronic documents transmitter. With such a configuration, there is no need for any external connectors to transfer power and/or electronic documents to the electronic document reader. As such, the thickness of such a reader may be substantially reduced compared to a device having external wired connectors.

Preferably, components internal to said reader are arranged such that a centre of balance of the reader is located substantially adjacent to said control. Such an arrangement of internal components allows the device to be easily balanced within the palm of a user's hand.

One aspect of the present invention also provides an electronic document reader for displaying electronic documents for reading by a user, said reader comprising: a display for displaying said electronic documents having an aspect ratio of a width of said display to a height of said display in the range of 1:2.2 to 1:2.9. Preferably, the ratio is approximately 1:2.45. With such an aspect ratio, the user is provided with an electronic document reader having a display that is easily-readable. Furthermore, the electronic documents may be displayed in a column format.

Preferably, the electronic document reader comprises a control for controlling displaying of said electronic document.

One aspect of the present invention also provide an electronic document reader for displaying electronic documents for reading by a user, said reader comprising: a display for displaying a said electronic document; and a control for controlling displaying of a said electronic document, wherein said reader has no external wired external connectors. By providing such an electronic document reader, the device may be made thinner than electronic readers comprising external wired connectors.

Preferably the reader is inductively coupleable with a charging device such that electrical power is transferable to a rechargeable power source of said reader. Preferably, the reader comprises storage means for storing one or more of said electronic documents and a wireless link, said electronic documents being wirelessly receivable from an electronic documents transmitter.

BRIEF DESCRIPTION OF THE DRAWINGS

Embodiments of the present invention will now be described by way of example only, with reference to the accompanying figures, in which:

FIG. 3 is a cross section through a display of the device according to an embodiment of the present invention.

DETAILED DESCRIPTION OF THE PREFERRED EMBODIMENT

Figure 1:
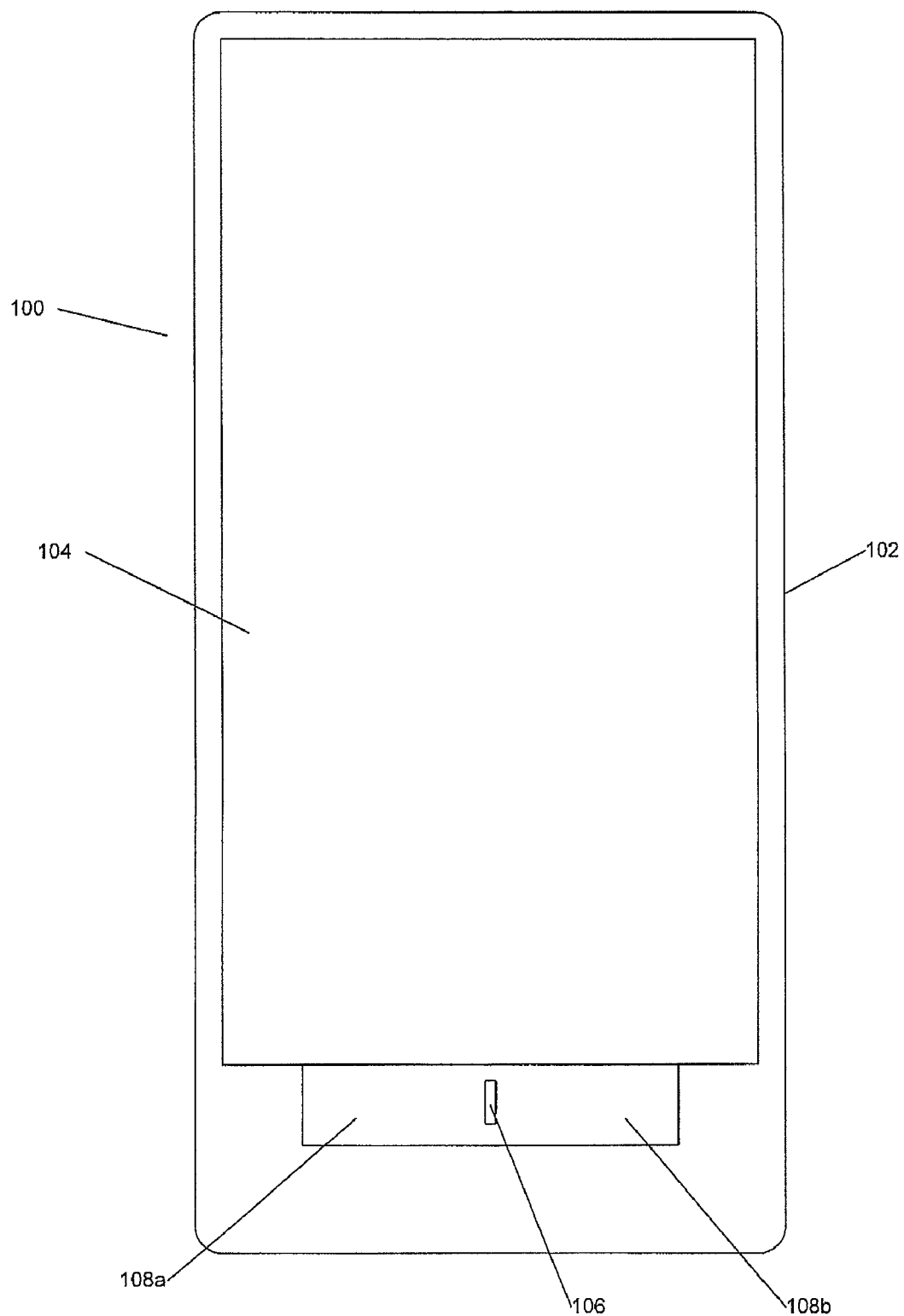
FIG. 1 shows an electronic document reader according to an embodiments of the present invention.

Referring to FIG. 1, this shows a preferred embodiment of an electronic document reader. The electronic document reader 100 comprises a display 104 and controls 106, 108a and 108b. The display and control are housed within a housing 102, together with, inter alia, a rechargeable power source (not shown), non-volatile memory (not shown) and control circuitry for driving the display (not shown).

Electronic documents are stored in non-volatile memory, for example Flash memory and are displayable on the display. Such electronic documents include text and/or drawings or pictures. The electronic documents may comprise displayable content in the form of articles, for example news items, books and other readable material.

The controls 106, 108a and 108b are used to control the displaying of the electronic documents. The controls enable the user to navigate through the document and to view other documents stored in the non-volatile memory.

The display of the electronic reader comprises no less than 80% of the surface area of the front of the reader. In preferred embodiments, the display comprises 85% of the surface area of the front of the reader. The aspect ration of the width to the height of the display is in the range of 1:2.2 to 1:2.9; more preferably the aspect ratio is approximately 1:2.45. the width of the display is no less than 70 mm; preferably the display is 80 mm wide. Such a large display is easily readable by a user. Housing 102 is preferably no wider than 120 mm. As such, the reader can be easily held in the palm of an adult human hand.

The reader lacks any external wired connectors. Power for recharging a rechargeable power source, and electronic documents for reading, are wirelessly coupled into the reader (as discussed in detail below). As such, the reader may be made very thin; less than 8 mm, but more preferably approximately 5 mm.

The reader may be provided with a waterproofing seal within the housing to prevent the ingress of water into the reader. Such a seal may comprise, for example, an 'O' ring around the perimeter of the housing. Alternatively other methods known to the skilled reader could be used.

Figure 2:
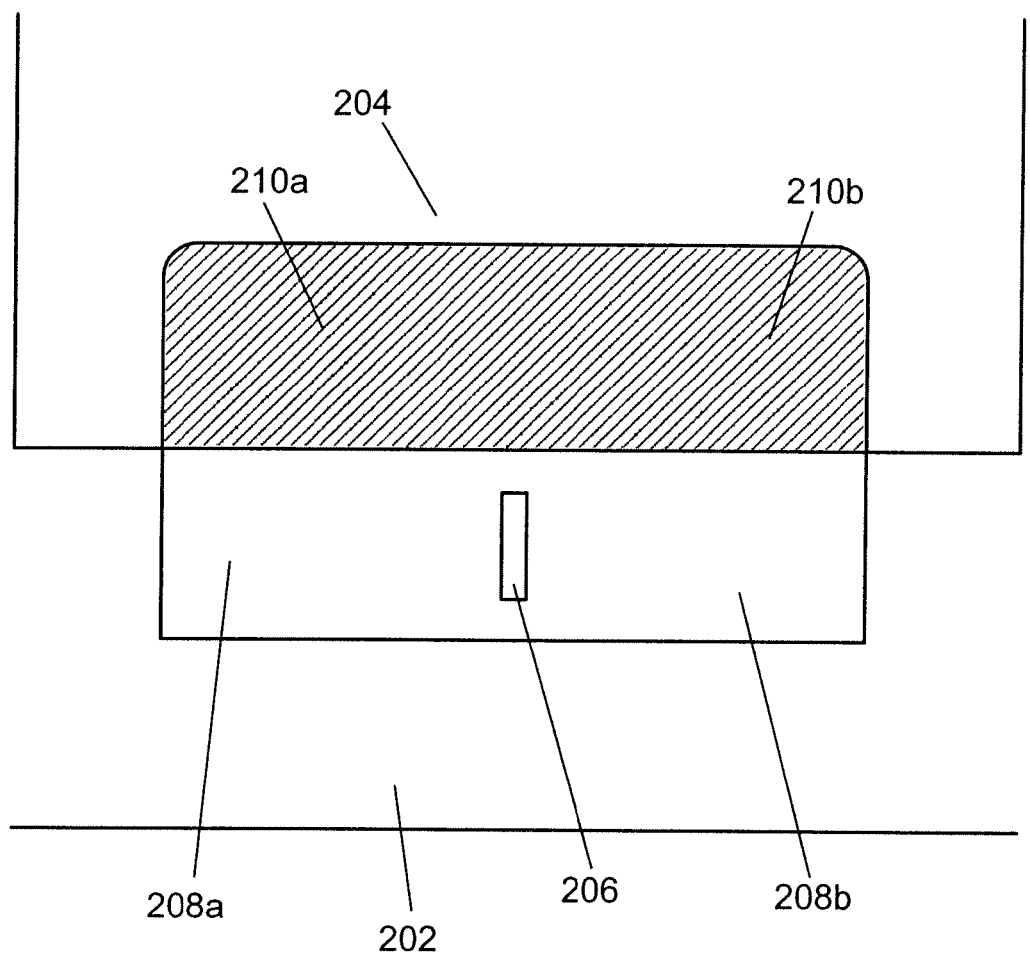
FIG. 2 is a close-up of the controls of the above device.

FIG. 2 shows a closer view of the controls of the above electronic document reader. The controls preferably comprise a joystick 206. Additionally, the controls comprise push-buttons 208a and 208b disposed adjacent the joystick. The user navigates through each electronic document and selects different electronic documents for reading using one or more of the controls. The action performed by each of the buttons varies depending on an operation mode of the electronic reader, as discussed in more detail below. Additionally, a soft function 210a and 210b is displayed on the display adjacent to the buttons 208a and 208b. The soft functions displayed on the display vary with the operation mode of the electronic reader, as discussed in more detail below. The soft functions inform the user of the actions possible using any of the controls 206, 208a and 208b.

Referring now to FIG. 3, this illustrates a vertical cross-section through a display 300 used in the above embodiments. The drawing is not to scale.

The illustrated example of the structure comprises a substrate 302, typically of plastic such as PET (polyethylene terephthalate) on which is fabricated a thin layer 304 of organic active matrix pixel driver circuitry. Attached over this, for example by adhesive, is a reflective bistable display (for example, an electrophoretic display) 306. However, embodiments of aspects of the invention may alternatively employ other display media, for example an organic LED display medium or a liquid crystal display medium. Approximate example thicknesses for the layers are as follows: 200 µm for substrate 302, 5-6 µm for active layer 304 and 190 µm for display 306.

A moisture barrier may also be provided over the electronic display 306 to prevent moisture from ingressing into the display structure. Such a barrier may be made from polyethylene and/or Aclar™, a fluoropolymer (polychlorotrifluoroethylene-PCTFE). A moisture barrier may also be provided under the substrate 302. Since a moisture barrier under the substrate need not be transparent, such a barrier would preferably incorporate a metallic moisture barrier such as a layer of aluminium foil. Example thicknesses of the moisture barrier above this display are 200 µm and 100 µm for the moisture barrier under the substrate.

In preferred embodiments the display medium is a reflective display medium, in particular a reflective bistable display (for example an electrophoretic, LCD or other like display) medium and the backplane comprises a flexible substrate such as PET or PEN (polyethylene naphthalene). Preferably the backplane is fabricated using solution based print processors, preferably patterned by techniques such as direct-writing, printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 and PCT/GB2006/050265, all hereby incorporated by reference in their entirety.

Figure 4:
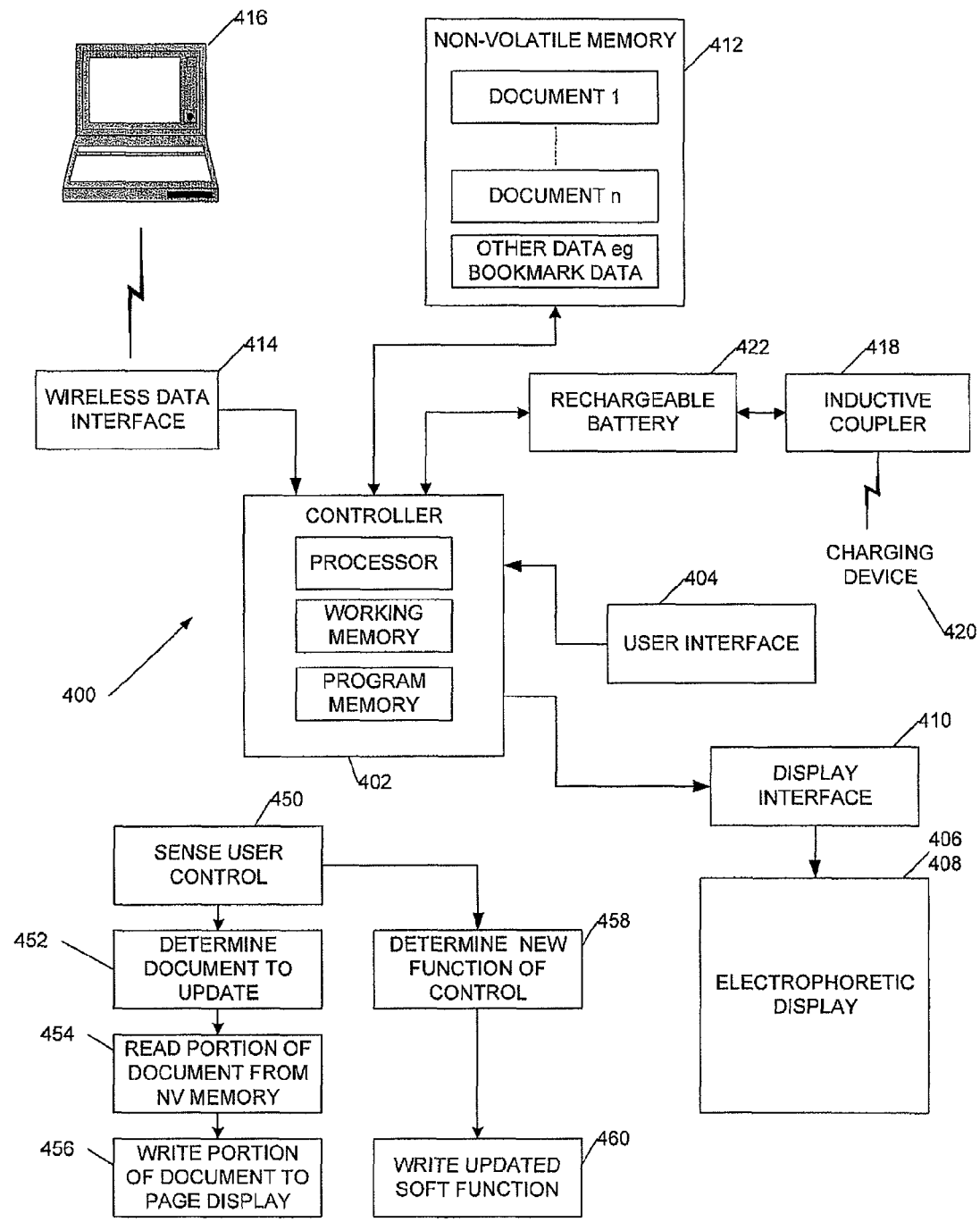
FIG. 4 shows a block diagram of the device according to an embodiment of the present invention.

Referring now to FIG. 4, this shows example control circuitry 400 suitable for the above-described electronic document reader. The control circuitry comprises a controller 402 including a processor, working memory and programme memory, coupled to a user interface 404 for example for controls 106, 108a and 108b. The controller is also coupled to the active matrix driver circuitry 406 and reflective bistable display 408 by a display interface 410 for example provided by integrated circuits. In this way controller 402 is able to send electronic documents to the display 408. The control electronics also includes non-volatile memory 412, for example Flash memory for storing electronic documents for one or more documents for display and, optionally, other electronic documents such as user bookmark locations and the like.

An interface 414 is provided for interfacing with a computer such as laptop 416 to receive document electronic documents and, optionally, to provide electronic documents such as user bookmark electronic documents. The interface 414 is preferably a wireless, for example Bluetooth™ interface. A rechargeable battery 412 or other rechargeable power source provides a power supply to the control electronics and display. An inductive coupler 418 is provided to inductively receive power from a charging device 420 for recharging the rechargeable power source. The lack of external wired connectors enables embodiments of the device to entirely dispense with physical electrical connections and hence facilitates inter alia improved device aesthetics The control circuits, rechargeable power source and other components are preferably disposed within the housing so as to provide a centre of mass that is within the lower portion of the reader (where the user would hold the reader in the palm of their hand to control the reader and read the electronic documents) such that the centre of mass is located approximately at the same position. Preferably, the centre of mass is located at a distance of no greater than 50% of the lower length of the reader; more preferably no greater than 33%.

The skilled person will appreciate that processor control code for a wide range of functions may be stored in the programme memory. By way of example, a simple document display procedure may comprise, in operation, sensing a user control 450, determining which document to update 452, reading a portion of the relevant document from the non-volatile memory 454, and writing the read portion of the document to the page display 456.

Also, the new action of the control is determined from the sensing of a user control 458 and the new soft function is written to the display 460. The soft function may include for example, "next page"; "next document"; "next article"; "previous page"; "previous document"; "previous article" etc.

The soft functions and the actions commanded by the push-button is determined by an operation mode of the reader, which is dependent on the type of document being read and the user's position within the document (beginning, end or somewhere inbetween).

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. An electronic document reading device configured for one hand operation, the device comprising:
a housing;
an electrophoretic display mounted in said housing above a pixel driver circuit, wherein said pixel driver circuit comprises organic pixel driver circuitry on a flexible plastic substrate;
control electronics coupled to said display for controlling displaying of an electronic document;
at least one user control coupled to said control electronics for operating said device wherein said control is operable using the same hand of a user that is used to hold said electronic document reading device while carrying said device in a palm of the hand and reading said electronic document; and
a rechargeable power source configured to power said control electronics and said display; and
wherein said housing has a width to fit at least on the palm of an adult human hand, said width being less than 90 mm,
wherein said display comprises no less than 80% of an area of said front surface of said device,
wherein said housing has a length of at least twice said width,
wherein a ratio of a length of a display area of said electrophoretic display to a width of said display area of said electrophoretic display is at least 2.2:1, and wherein said device has a thickness of substantially equal to or less than 5 mm, and
wherein said control electronics and said rechargeable power source are disposed within said housing so as to provide a center of mass of said device which, when a lower part of said device is held in a said palm, is located at a distance of no greater than 33% of said length from a lower end of said device and located substantially adjacent to said user control.

2. An electronic document reading device according to claim 1, wherein said user control comprises a joystick configured for thumb-control by a thumb of a hand holding said device when said lower part of said device is held in said palm.

3. An electronic document reading device according to claim 1, wherein said user control further comprises at least one push-button adjacent both said joystick and said electrophoretic display and wherein said control electronics is configured to display a soft function for said push-button on a portion of said display adjacent said push-button.

4. An electronic document reading device according to claim 1, further comprising an inductively coupled charging system for said rechargeable power source, and wherein said device lacks any external wired connectors.

5. An electronic document reading device according to claim 1, wherein a ratio of a length of a display area of said electrophoretic display to a width of said display area of said electrophoretic display is in the range of 2.2:1 to 2.9:1.

6. An electronic document reading device according to claim 5, wherein said ratio is approximately 2.45:1.

* * * * *

UNITED STATES PATENT AND TRADEMARK OFFICE
CERTIFICATE OF CORRECTION

| | | Page 1 of 1 |
|---|---|---|
| PATENT NO. | : 8,207,947 B2 | |
| APPLICATION NO. | : 12/027160 | |
| DATED | : June 26, 2012 | |
| INVENTOR(S) | : Matthew Marsh | |

It is certified that error appears in the above-identified patent and that said Letters Patent is hereby corrected as shown below:

Column 6, line 48, Claim 3, delete "claim 1," and insert -- claim 2, --, therefor.

Signed and Sealed this
Twenty-eighth Day of August, 2012

David J. Kappos
*Director of the United States Patent and Trademark Office*